(12) United States Patent
Gomadam (10) Patent No.: US 9,544,117 B2
(45) Date of Patent: Jan. 10, 2017

(54) ADAPTIVE REFERENCE SIGNAL MAPPING IN WIRELESS MULTI-ACCESS COMMUNICATION NETWORKS

(71) Applicant: Broadcom Corporation, Irvine, CA (US)

(72) Inventor: Krishna Gomadam, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 306 days.

(21) Appl. No.: 14/189,661

(22) Filed: Feb. 25, 2014

(65) Prior Publication Data

US 2014/0247778 A1    Sep. 4, 2014

Related U.S. Application Data

(60) Provisional application No. 61/771,388, filed on Mar. 1, 2013.

(51) Int. Cl.
| | | |
|---|---|---|
| *H04W 72/04* | (2009.01) | |
| *H04L 5/00* | (2006.01) | |
| *H04W 28/18* | (2009.01) | |
| *H04W 8/22* | (2009.01) | |

(52) U.S. Cl.
CPC ........... *H04L 5/0051* (2013.01); *H04L 5/0053* (2013.01); *H04L 5/0094* (2013.01); *H04L 5/0023* (2013.01); *H04W 8/22* (2013.01); *H04W 28/18* (2013.01)

(58) Field of Classification Search
CPC .... H04L 5/0051; H04L 5/0053; H04L 5/0094; H04L 5/0023; H04W 8/22; H04W 28/18
See application file for complete search history.

(56) References Cited

U.S. PATENT DOCUMENTS

| | | | |
|---|---|---|---|
| 2013/0163530 A1* | 6/2013 | Chen | H04W 72/04 370/329 |
| 2016/0006546 A1* | 1/2016 | Yi | H04L 5/001 370/329 |
| 2016/0087774 A1* | 3/2016 | Guo | H04L 5/0051 370/329 |

FOREIGN PATENT DOCUMENTS

| | | | | |
|---|---|---|---|---|
| WO | WO2014/119919 A1 * | 8/2014 | | H04B 7/26 |
| WO | WO2014/161142 A1 * | 10/2014 | | H04W 72/04 |

OTHER PUBLICATIONS

U.S. Appl. No. 61/771,388, filed Mar. 1, 2013.*

(Continued)

*Primary Examiner* — Melvin Marcelo
(74) *Attorney, Agent, or Firm* — Sterne, Kessler, Goldstein & Fox PLLC (57) ABSTRACT

Embodiments provide systems and methods for adaptive reference signal mapping in wireless multi-access communication networks, including LTE, WLAN, WiMAX, Bluetooth, etc. In an embodiment, the reference signal mapping configuration is user equipment (UE) specific and can be configured semi-statically or dynamically according to one or more communication related parameters of the UE. The one or more parameters can include, without limitation, a modulation scheme used for communication with the UE, a modulation and coding scheme (MCS) used for communication with the UE, a distance of the UE relative to the base station, an antenna configuration at the UE, interference management capability of the UE, and a rank of the UE.

20 Claims, 8 Drawing Sheets

(56) References Cited

OTHER PUBLICATIONS

U.S. Appl. No. 61/760,031, filed Feb. 1, 2013.*
R1-130138, 'Downlink DMRS redunction for small cell', 3GPP TSG RAN WG1 Meeting #72, Source ZTE, Jan. 28-Feb. 1, 2013, pp. 1-5.*

* cited by examiner

ADAPTIVE REFERENCE SIGNAL MAPPING IN WIRELESS MULTI-ACCESS COMMUNICATION NETWORKS

CROSS-REFERENCE TO RELATED APPLICATION(S)

The present application claims the benefit of U.S. Provisional Application No. 61/771,388, filed Mar. 1, 2013, which is incorporated herein by reference in its entirety.

TECHNICAL FIELD

The present disclosure relates generally to reference signal mapping in wireless multi-access communication networks.

BACKGROUND

Background Art

Improving spectral efficiency continues to be an objective for future wireless multi-access communication network standards, such as Long Term Evolution (LTE), Wireless Local Area Network (WLAN), WiMAX, etc. One area where a potential for improvement in spectral efficiency exists is small cell environments, such as femtocells, for example. In a small cell, the path loss between a base station and a user equipment (UE) is smaller than in a large cell, and as a result the UE generally observes a higher Signal-to-Interference-and-Noise Ratio (SINR) than in the large cell.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Improving spectral efficiency continues to be an objective for future wireless multi-access communication network standards, such as Long Term Evolution (LTE), Wireless Local Area Network (WLAN), WiMAX, etc. One area where a potential for improvement in spectral efficiency exists is small cell environments, such as femtocells, for example. In a small cell, the path loss between a base station and a user equipment (UE) is smaller than in a large cell, and as a result the UE generally observes a higher Signal-to-Interference-and-Noise Ratio (SINR) than in the large cell.

The higher SINR allows for higher order modulation schemes, such as 256-QAM (256-Quadrature Amplitude Modulation), to be used for communication between the base station and the UE, which directly increases spectral efficiency. However, higher order modulation schemes require greater channel estimation accuracy and an increased reference signal overhead, which is directly at odds with the objective of improving spectral efficiency.

Figure 1:
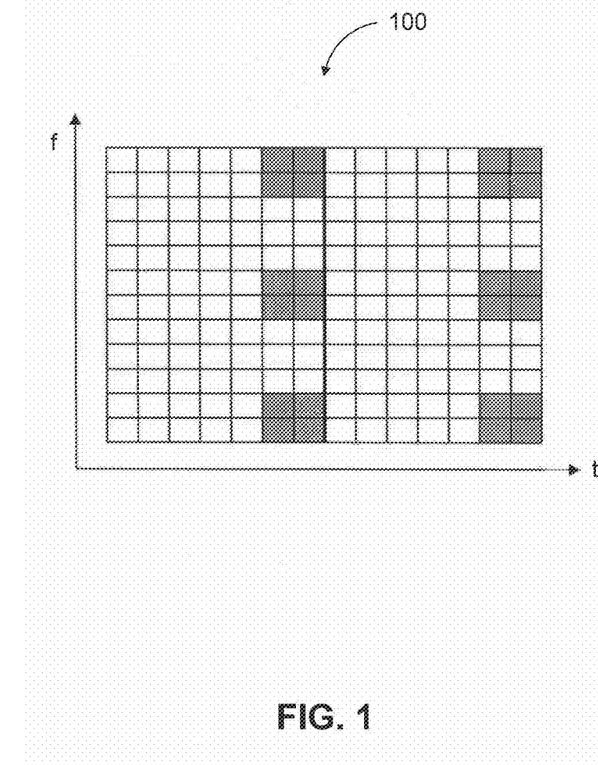
FIG. 1 illustrates an example reference signal mapping configuration.

Existing approaches use a fixed reference signal mapping configuration for allocating resource elements (REs) to reference signals. As understood by a person of skill in the art, reference signals are known a priori at the UE and are used for channel estimation. For example, FIG. 1 illustrates a reference signal mapping configuration 100 used in LTE for UE specific reference signals. The UE specific reference signals are known as Demodulation Reference Signals (DMRS) and occupy REs of the data bearing Physical Downlink Shared Channel (PDSCH). The grid shown in FIG. 1 corresponds to a pair of consecutive (back to back in time) Physical Resource Blocks (PRBs) of the PDSCH. As shown, each PRB corresponds to 7 timeslots over 12 sub-carriers. In an embodiment, a PRB pair corresponds to one Orthogonal Frequency Division Multiplexing (OFDM) sub-frame and is 1 milliseconds long.

For a UE with a rank equal to 1 or 2 (i.e., a UE being served up to two simultaneous data streams by the base station), LTE's current reference signal mapping configuration 100 assigns a total of 12 REs for DMRS pilots in a given PRB pair. These REs are illustrated using grey shading FIG. 1. For higher UE ranks (e.g., 3 to 8), 24 REs are used for DMRS pilots in each PRB pair. However, LTE does not currently account for other UE communication related parameters in the mapping of REs to reference signals. For example, QPSK (Quadrature Phase Shift Keying) and 64-QAM have different channel estimation accuracy requirements. Yet, currently, the same fixed reference signal mapping configuration 100 is used for both modulation schemes, resulting in unnecessary reference signal overhead for QPSK and inadequate channel estimation performance for 64-QAM.

Embodiments, as further described below, provide systems and methods for adaptive reference signal mapping in wireless multi-access communication networks, including LTE, WLAN, WiMAX, Bluetooth, etc. In an embodiment, the reference signal mapping configuration is UE specific and can be configured semi-statically or dynamically according to one or more communication related parameters of the UE. The one or more parameters can include, without limitation, a modulation scheme used for communication with the UE, a modulation and coding scheme (MCS) used for communication with the UE, a distance of the UE relative to the base station, an antenna configuration at the UE, interference management capability of the UE, and a rank of the UE. In other embodiments, the one or more parameters can include any parameter, at the UE and/or the base station, that can affect directly or indirectly the spectral efficiency of communication with the UE.

Figure 2:
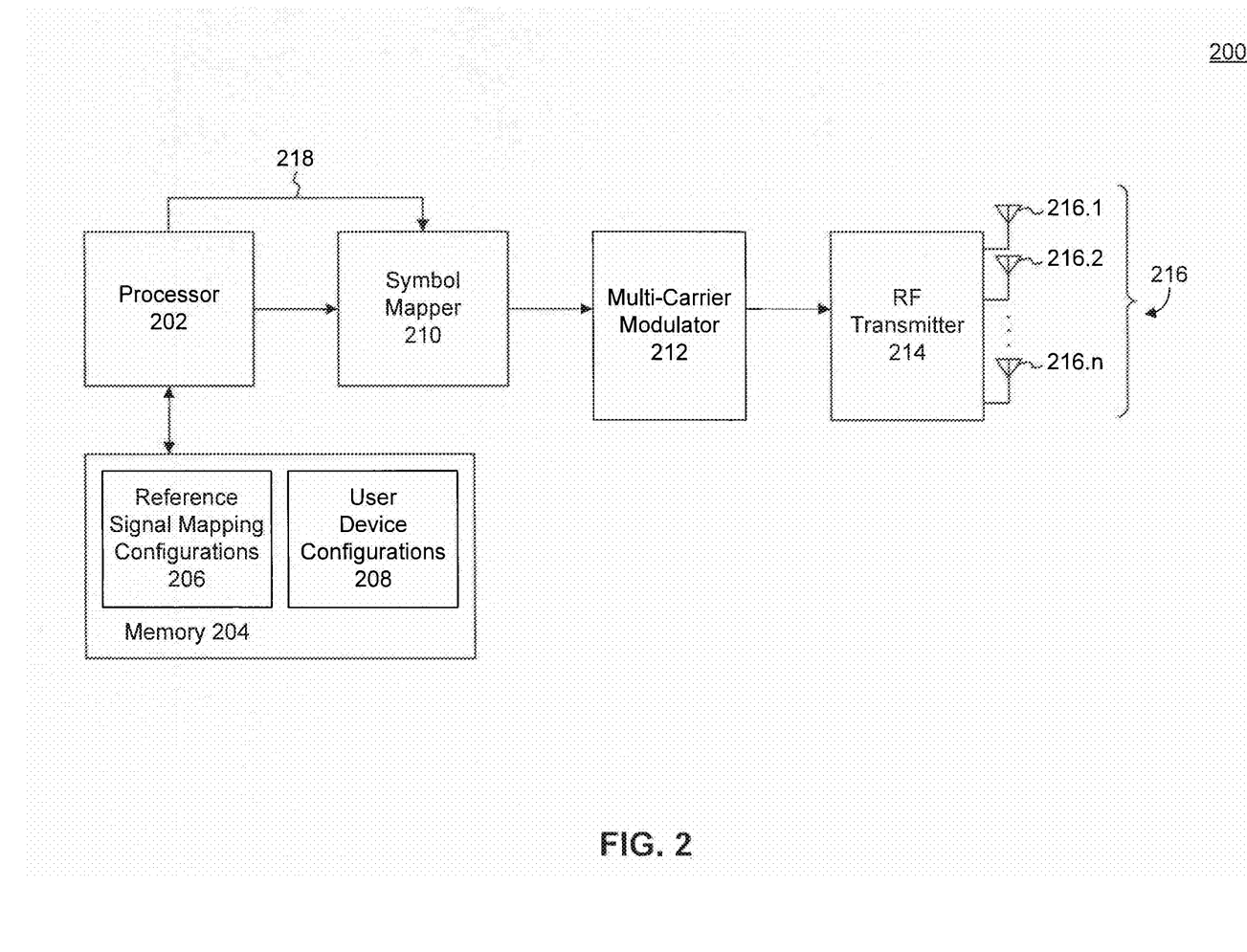
FIG. 2 illustrates an example base station according to an embodiment.

FIG. 2 illustrates an example base station 200 according to an embodiment. Example base station 200 is provided for the purpose of illustration only and is not limiting of embodiments. Example base station 200 can be used to perform embodiments of the present disclosure as further described below. As shown in FIG. 1, example base station 200 includes, without limitation, a processor 202, a memory 204, a symbol mapper 210, a multi-carrier modulator 212, a radio frequency (RF) transmitter 214, and a plurality of antennas 216.1, 216.2, . . . , 216.n.

In an embodiment, memory 204 is configured to store reference signal mapping configurations 206 and user device configurations 208. In another embodiment, memory 204 further stores logic instructions that when executed by processor 202 enable processor 202 to perform the functionality described herein.

Reference signal mapping configurations 206 include a plurality of reference signal mapping configurations according to embodiments. Each of the reference signal mapping configurations corresponds to a particular allocation of REs of the PDSCH to reference signals. In an embodiment, the allocation of REs of the PDSCH to reference signals is defined on a PRB pair basis, thereby determining the number and specific locations of REs of the PDSCH reserved for reference signals within the PRB pair. In other embodiments, the allocation can be defined on a smaller or a larger RE block than a PRB pair. In one embodiment, the reference signals are UE specific reference signals. In another embodiment, the reference signals are DMRS.

User device configurations 208 include communication related parameters associated with one or more UEs associated with base station 200. The one or more UEs can correspond to UEs currently being served by base station 200 and/or to UEs previously having been served by base station 200. In an embodiment, the user device configuration of a UE can include communication related parameters, such as, without limitation, a modulation scheme used for communication with the UE (in the downlink and/or uplink), an MCS used for communication with the UE (in the downlink and/or uplink), a distance of the UE relative to base station 200 (e.g., a rough estimate of the distance), an antenna configuration at the UE (e.g., number of receive antennas, degree of correlation of receive antennas, etc.), interference management capability of the UE (e.g., availability of advanced interference rejection or suppression at the UE), and a rank of the UE (number of simultaneous data streams being transmitted to the UE from base station 200). Other communication related parameters can also be included in the user device configuration of the UE. For example, in an embodiment, any communication related parameter associated with the UE that can affect the spectral efficiency of communication with the UE can be included in the user device configuration of the UE stored in user device configurations 208. As would be understood by a person of skill in the art, some of the communication related parameters can be fixed, while others can change over time. In embodiments, base station 200 tracks and updates any changing communication related parameters in user device configurations 208.

Base station 200 is configured to determine and to dynamically adapt the reference signal mapping configuration used for a particular UE based on the communication related parameters associated with the UE. As mentioned above, the reference signal mapping configuration includes locations of REs for carrying reference signals within a PRB pair of the PDSCH allocated to the UE. In an embodiment, processor 202 is configured to determine one or more communication related parameters associated with the UE from user device configurations 208 stored in memory 204. Based on the one or more communication related parameters, processor 202 identifies a first reference signal mapping configuration from among reference signal mapping configurations 206 stored in memory 204.

For example, processor 202 may identify the first reference signal mapping configuration based on the modulation scheme used for communication with the UE. Alternatively or additionally, processor 202 may identify the first reference signal mapping configuration based on the distance of the UE from base station 200. For example, in an embodiment, processor 202 assumes that the downlink channel from base station 200 to the UE is more stable, and therefore requires less reference signaling for channel estimation, when the UE is closer to base station 200. Alternatively or additionally, processor 202 may identify the first reference signal mapping configuration based on the antenna configuration at the UE and/or the interference management capability of the UE, both of which can affect the required channel estimation accuracy at the UP and by consequence the amount of required reference signaling to the UE.

In another embodiment, base station 200 can further determine and dynamically adapt the reference signal mapping configuration for a particular UE based on parameters associated with base station 200. In an embodiment, the parameters taken into account are parameters that can affect the spectral efficiency of communication with the UE. For example, in an embodiment, base station 200 can account for traffic load at base station 200 in determining the reference signal mapping configuration for the UE. For instance, if base station 200 is heavily loaded such that it is serving more than one UE using the same PRB pair of the PDSCH (e.g., using Multi-User Multiple Input Multiple Output (MU-MIMO)), then base station 200 may use a reference signal mapping configuration with more REs reserved to reference signals. This can result in a better channel estimation accuracy at the UE in view of anticipated increased interference. In another embodiment, base station 200 can determine the reference signal mapping configuration for the UE based on the number of transmit antennas at base station 200 used for communication to the UE. In an embodiment, as more transmit antennas are used, a higher SINR can be achieved at the UE and a reference signal mapping configuration with lower reference signaling overhead can be used.

After identifying the first reference signal mapping configuration, processor 202 embeds a plurality of reference signal bits within a user data bit stream for the UE in accordance with the first reference signal mapping configuration to result in a combined bit stream. In an embodiment, processor 202 embeds the plurality of reference signal bits at specific locations within the user data bit stream such that when the combined bit stream is loaded into the PRB pair the reference signal bits occupy those REs of the PRB pair indicated by the first reference signal mapping configuration. For example, with reference to the example configuration of FIG. 1, the plurality of reference signal bits are embedded within the user data bit stream such that they occupy the grey shaded REs when the combined bit stream in loaded into the PRB pair. In an embodiment, the combined bit stream is loaded into the PRB pair subcarrier by subcarrier (e.g., starting with the lowest frequency subcarrier of the PRB pair).

Subsequently, processor 202 provides the combined bit stream to symbol mapper 210. In an embodiment, processor 202 further indicates a modulation scheme to symbol mapper 210 by means of a control signal 218. Symbol mapper 210 uses the modulation scheme indicated by control signal 218 to generate a plurality of symbols (e.g., constellation points) from the combined bit stream. The plurality of symbols are then provided to multi-carrier modulator 212, which modulates the plurality of symbols onto respective subcarriers of the PRB pair to generate a multi-carrier subframe. In an embodiment, multi-carrier modulator 212 includes an Inverse Fast Fourier Transtorm (IFFT) module. In an embodiment, the plurality of symbols include a plurality of reference symbols corresponding to the plurality of reference signal bits. Multi-carrier modulator 212 modulates the reference symbols such that they occupy the REs of the PRB pair indicated by the first reference signal mapping configuration.

The output of multi-carrier modulator 212 is then provided to RF transmitter 214. RF transmitter 214 can perform analog functions such as frequency up-conversion, power amplification, and filtering on the output of multi-carrier modulator 212 before transmitting the resulting signals via one or more of antennas 216 to the UE. As such, RF transmitter 214 transmits the multi-carrier subframe to the UE in the PRB pair allocated to the UE. The plurality of reference symbols are transmitted at the REs reserved for carrying reference signals within the PRB pair according to the first reference signal mapping configuration.

In another embodiment, processor 202 is configured to detect a change in the one or more communication related parameters associated with the UE and/or parameters associated with base station 200 and to identify a second reference signal mapping configuration from among reference signal mapping configurations 206 responsive to the detected change. For example, processor 202 can be configured to detect a change in a modulation order or the MCS of the UE, and to identify the second reference signal mapping configuration responsive to the change in the modulation order. For example, if the change corresponds to an increase in the modulation order or MCS of the UE (e.g., from QPSK to 64-QAM, from 16-QAM to 256 QAM, etc.), the second reference signal mapping configuration can be selected to include a larger number of REs for carrying reference signals than the first reference signal mapping configuration. This improves the channel estimation accuracy at the UE enabling better performance for higher order modulation schemes. Alternatively, the second reference signal mapping configuration can include a lower number of REs for carrying reference signals than the first reference signal mapping configuration when an increase in the modulation order or MCS is detected. Similarly, when a decrease in the modulation order or MCS is detected, processor 202 can identify a second reference signal mapping configuration with a lower or a larger number of REs for carrying reference signals than the first reference signal mapping configuration.

In another embodiment, processor 202 can be configured to detect a change in the distance of the UE relative to base station 200, and to identify the second reference signal mapping configuration responsive to the distance change. For example, in an embodiment, processor 202 can detect that the distance between the UE and base station 200 has increased beyond a defined threshold. In response, processor 202 can select the second reference signal configuration to include a larger number of REs for carrying reference signals than the first reference signal mapping configuration.

As described above, in embodiments, base station 200 can be configured to determine and to dynamically adapt the reference signal mapping configuration used for a particular UE based on a variety of communication related parameters associated with the UE and/or parameters associated with base station 200 itself. Examples of such parameters are provided above for the purpose of illustration only and not limitation. As would be understood by a person of skill in the art, various other parameters can also be used.

In the following, example reference signal mapping configurations according to embodiments are provided. These example configurations are also provided for the purpose of illustration only and are not limiting of embodiments. In an embodiment, the reference signal mapping configurations can be grouped into various patterns, with each pattern being suited for a particular communication scenario with the UE. In another embodiment, each pattern includes multiple reference signal mapping configurations for various modulation schemes (and/or other communication related parameter), for example. The base station can dynamically adapt the reference signal mapping configuration for the UE by varying the configuration within a given pattern and/or across the various patterns. To signal a selected reference signal mapping configuration to the UE, in one embodiment, the base station signals an index corresponding to the pattern containing the selected reference signal mapping configuration. The UE can then determine the selected reference signal mapping configuration from the signaled pattern based on the used modulation scheme (and/or the other communication related parameter).

Figure 3A:
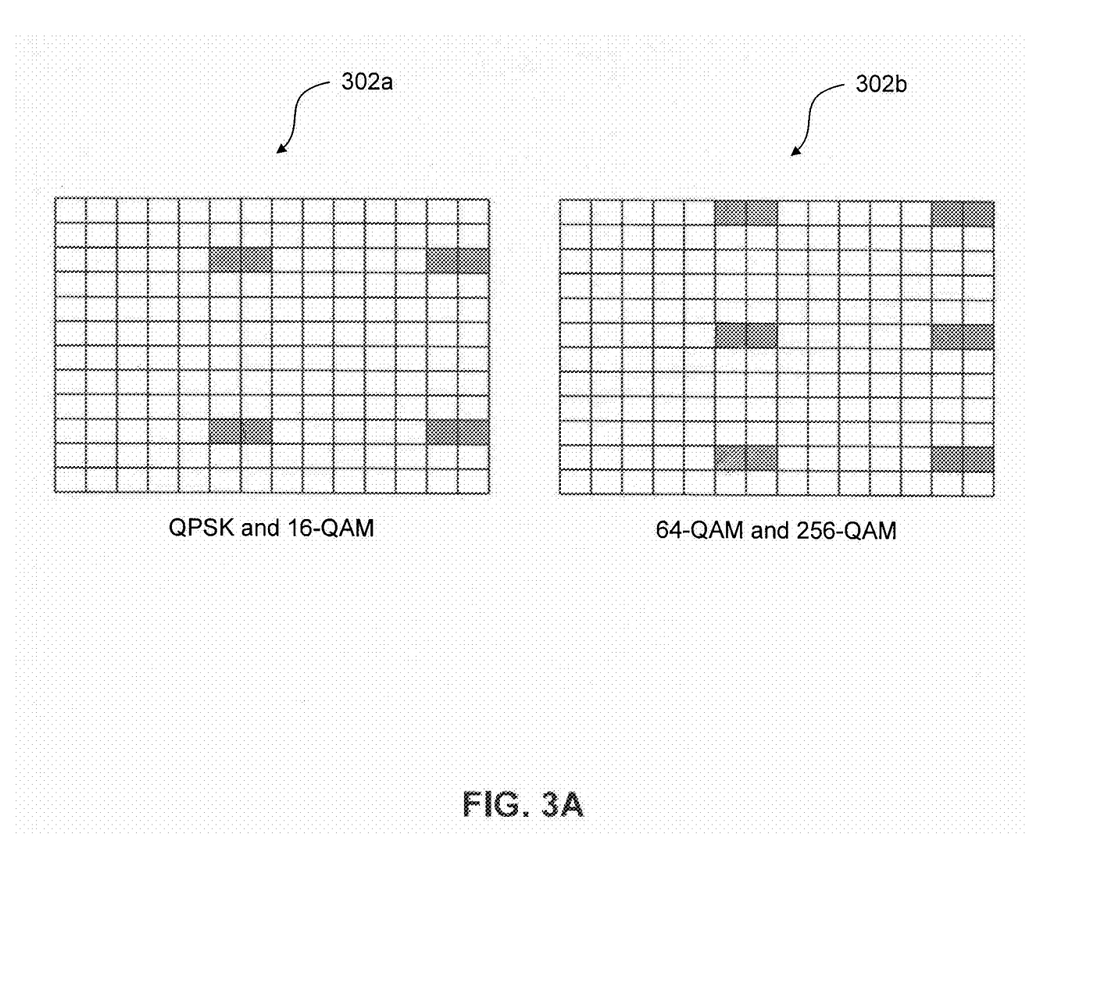
FIGS. 3A-3D illustrate example patterns of reference signal mapping configurations according to embodiments.

FIG. 3A illustrates a first example pattern of reference signal mapping configurations according to an embodiment. As shown in FIG. 3A, the first example pattern includes two reference signal mapping configurations 302a and 302b. In other embodiments, the first example pattern can include more than two configurations. In an embodiment, configurations 302a and 302b are used for UEs with ranks less than or equal to 2. For higher ranks, configurations with additional reference signal REs can be employed. In an embodiment, configuration 302a is used for QPSK and 16-QAM, and configuration 302b is used for 64-QAM and 256-QAM.

It is noted that configuration 302b is equivalent to LTE's current fixed reference signal mapping configuration, described with reference to FIG. 1 above. In contrast, configuration 302a uses less REs for reference signals and thus results in a lower reference signal overhead for QPSK and 16-QAM compared to LTE's current approach. In another embodiment, to maintain backward compatibility with LTE's current approach, the first pattern can include configuration 302b for QPSK, 16-QAM, and 64-QAM and another configuration with more than 12 REs in the PRB pair (not shown in FIG. 3A) for 256-QAM.

Figure 3B:
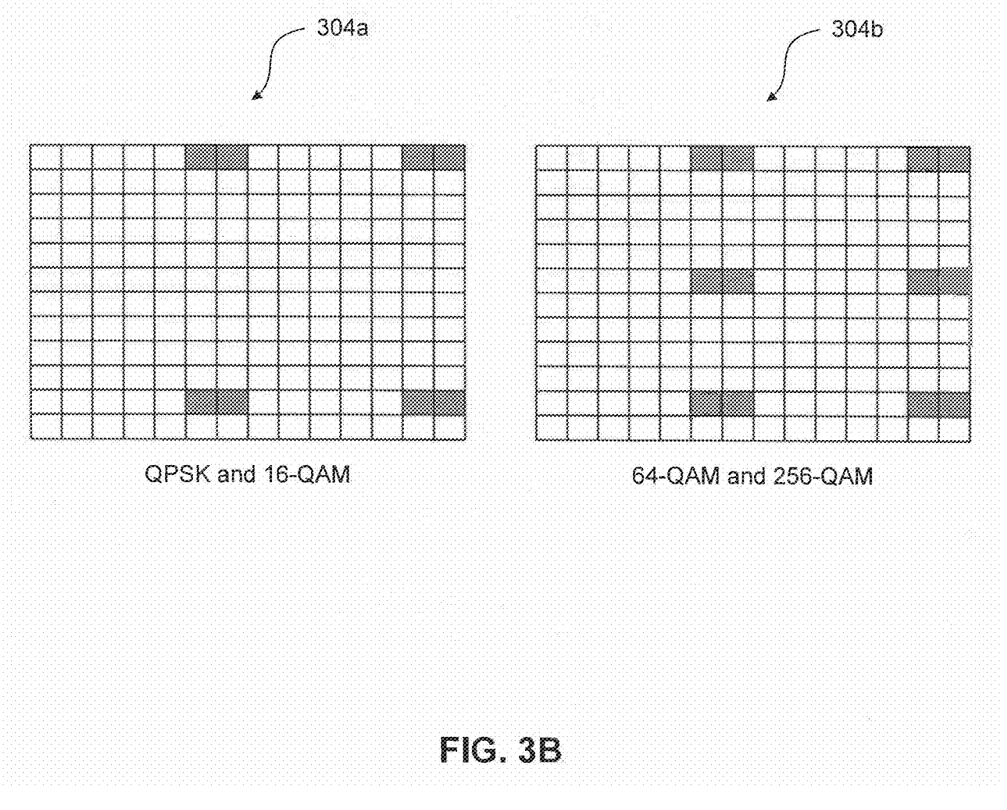

FIG. 3B illustrates a second example pattern of reference signal mapping configurations according to an embodiment. As shown in FIG. 3B, the second example pattern includes two reference signal mapping configurations 304a and 304b. In an embodiment, configurations 304a and 304b are used for UEs with ranks less than or equal to 2. For higher ranks, configurations with additional reference signal REs can be employed. In an embodiment, configuration 304a is used for QPSK and 16-QAM, and configuration 304b is used for 64-QAM and 256-QAM.

Like configuration 302b, configuration 304b is also equivalent to LTE's current fixed reference signal mapping configuration. Configuration 302a uses less reference signal REs than configuration 304a and thus results in a lower reference signal overhead for QPSK and 16-QAM. In fact, as shown in FIG. 3B, configuration 304a is obtained by eliminating 4 reference signal REs from configuration 304b. As such, configuration 304a can be readily obtained by modifying LTE's current fixed reference signal mapping configuration.

Figure 3C:
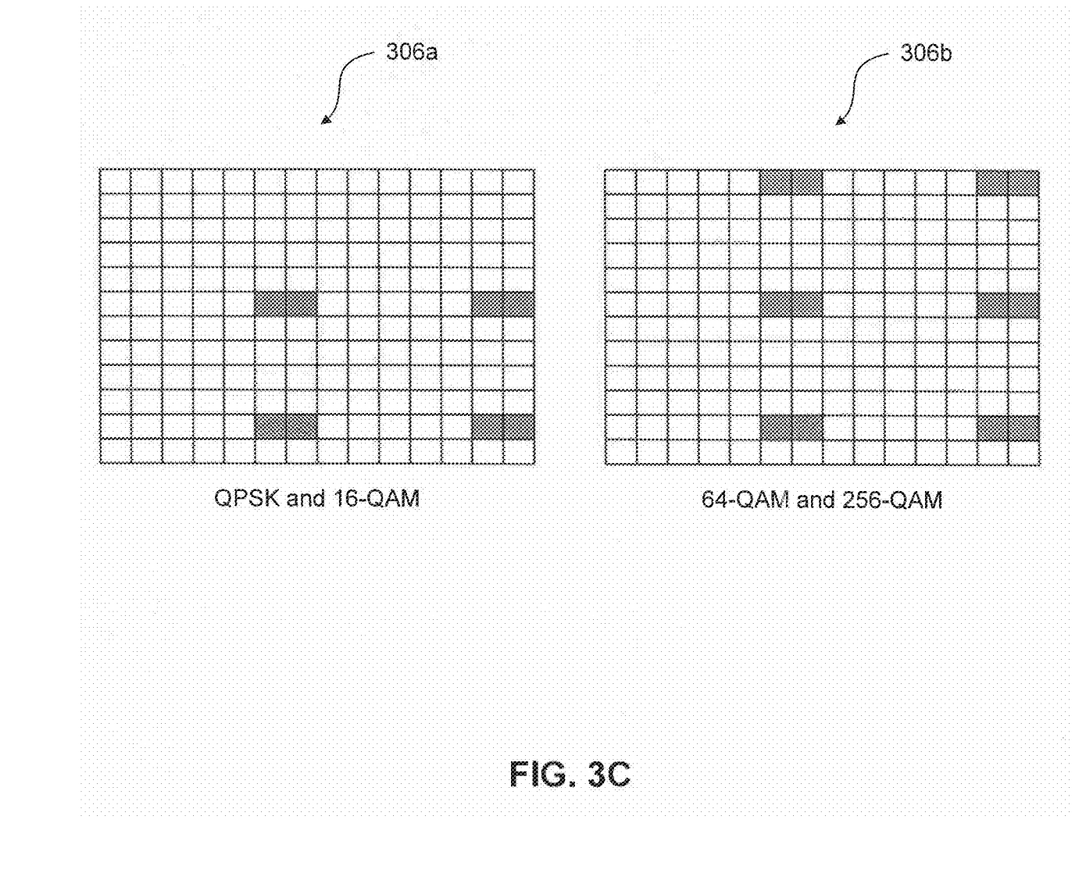

FIG. 3C illustrates a third example pattern of reference signal mapping configurations according to an embodiment. As shown in FIG. 3C, the third example pattern includes two reference signal mapping configurations 306a and 306b. In an embodiment, configurations 306a and 306b are used for UEs with ranks less than or equal to 2. For higher ranks, configurations with additional reference signal REs can be employed. In an embodiment, configuration 306a is used for QPSK and 16-QAM, and configuration 306b is used for 64-QAM and 256-QAM.

Configuration 306b is identical to configurations 302b and 304b described above. Configuration 306a is obtained by eliminating 4 reference signal REs from configuration 306b. As such, like configuration 304a, configuration 306a can be readily obtained by modifying LTE's current fixed reference signal mapping configuration. In contrast, reference signal REs in configuration 306a are less spread apart in frequency than the reference signal REs of configuration 304a. As such, configuration 304a can be more suitable than configuration 306a for changing channel conditions, which can be due to movement of the UE, for example.

Figure 3D:
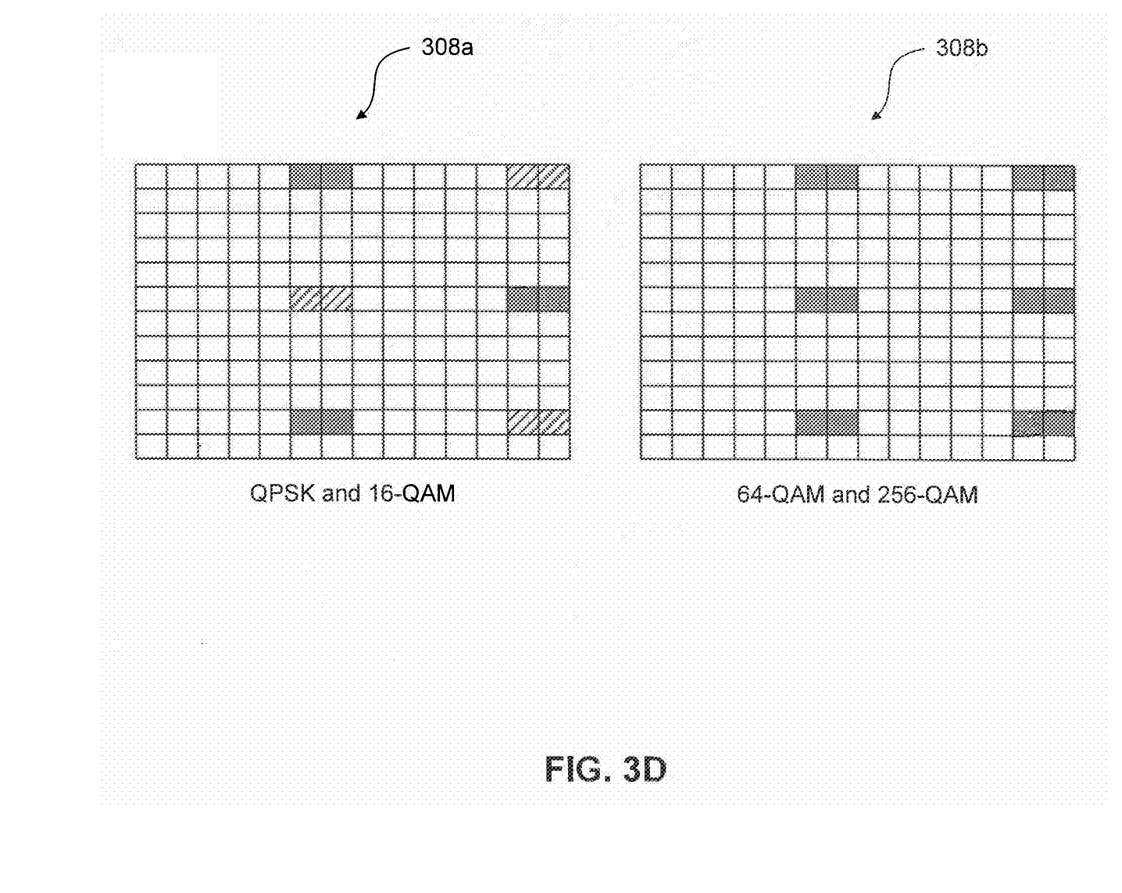

FIG. 3D illustrates a fourth example pattern of reference signal mapping configurations according to an embodiment. As shown in FIG. 3D, the fourth example pattern includes two reference signal mapping configurations 308a and 308b. In an embodiment, configurations 308a and 308b are used for UEs with ranks less than or equal to 2. For higher ranks, configurations with additional reference signal REs can be employed. In an embodiment, configuration 308a is used for QPSK and 16-QAM, and configuration 308b is used for 64-QAM and 256-QAM.

Configuration 308b is identical to configurations 302b, 304b, and 306b described above. Configuration 308a is obtained by eliminating 6 reference signals REs from configuration 308b. As such, like configuration 304a, configuration 308a can be readily obtained by modifying LTE's current fixed reference signal mapping configuration. However, configuration 308a uses less reference signal REs than configuration 304a, and as such has lower reference signal overhead than configuration 304a. In an embodiment, to augment the number of reference signal measurements obtained using configuration 308a, the reference signal measurements in each PRB are reused for the subsequent PRB. For example, in FIG. 3D, the REs shown with hatching correspond to REs for which measurements are reused from equivalent REs (same timeslot/frequency subcarrier) of the previous PRB. As such, within any given PRB pair, measurements corresponding to 12 REs can be generated.

Figure 4:
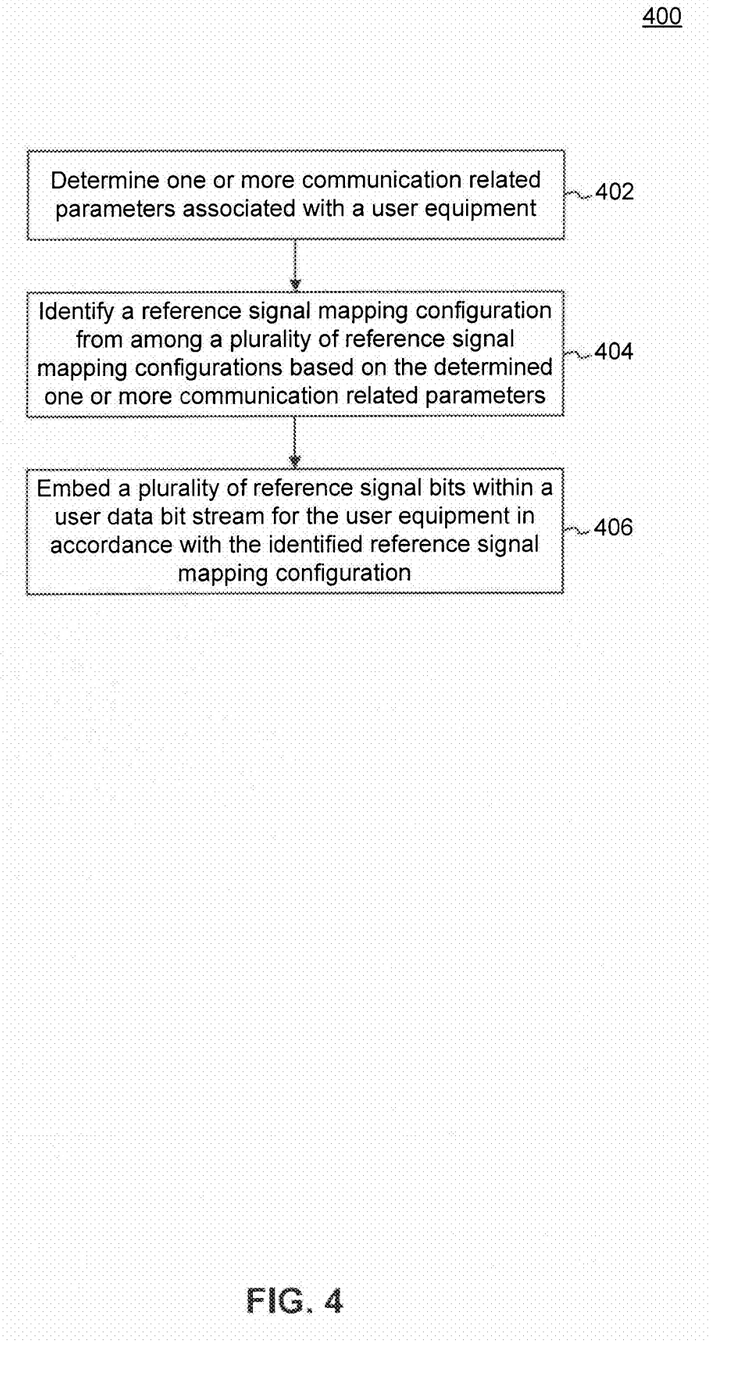
FIG. 4 illustrates an example process according to an embodiment.

FIG. 4 illustrates an example process 400 according to an embodiment. Example process 400 is provided for the purpose of illustration only and is not limiting of embodiments. Example process 400 can be performed by a base station, such as example base station 200, to determine and use a reference signal mapping configuration in communication with a UE. In another embodiment, some of the steps of process 400 can be performed by the UE.

As shown in FIG. 4, process 400 begins in step 402, which includes determining one or more communication related parameters associated with the UE. In an embodiment, the one or more parameters can include, without limitation, a modulation scheme used for communication with the UE, a modulation and coding scheme used for communication with the UE, a distance of the UE relative to the base station, an antenna configuration at the UE, interference management capability of the UE, and a rank of the UE. In other embodiments, the one or more parameters can include any parameter, at the UE and/or the base station, that can affect directly or indirectly the spectral efficiency of communication with the UE. In an embodiment, step 402 further includes retrieving the one or more communication related parameters from a memory of the base station. In another embodiment, step 402 can be performed by the UE itself, and the determined parameters are sent to the base station.

Subsequently, step 404 includes identifying a reference signal mapping configuration from among a plurality of reference signal mapping configurations based on the determined one or more communication related parameters. As mentioned above, the reference signal mapping configuration includes locations of REs for carrying reference signals within a PRB pair of the PDSCH allocated to the UE. In an embodiment, the plurality of reference signal mapping configurations are pre-defined and shared between the base station and the UE. In another embodiment, the reference signal mapping configuration can be identified by the UE and then signaled to the base station.

Process 400 terminates in step 406, which includes embedding a plurality of reference signal bits within a user data bit stream for the UE in accordance with the identified reference signal mapping configuration. In an embodiment, step 406 includes embedding the plurality of reference signal bits at specific locations within the user data bit stream such that when a combined bit stream is loaded into the PRB pair the reference signal bits occupy those REs of the PRB pair indicated by the identified reference signal mapping configuration.

Figure 5:
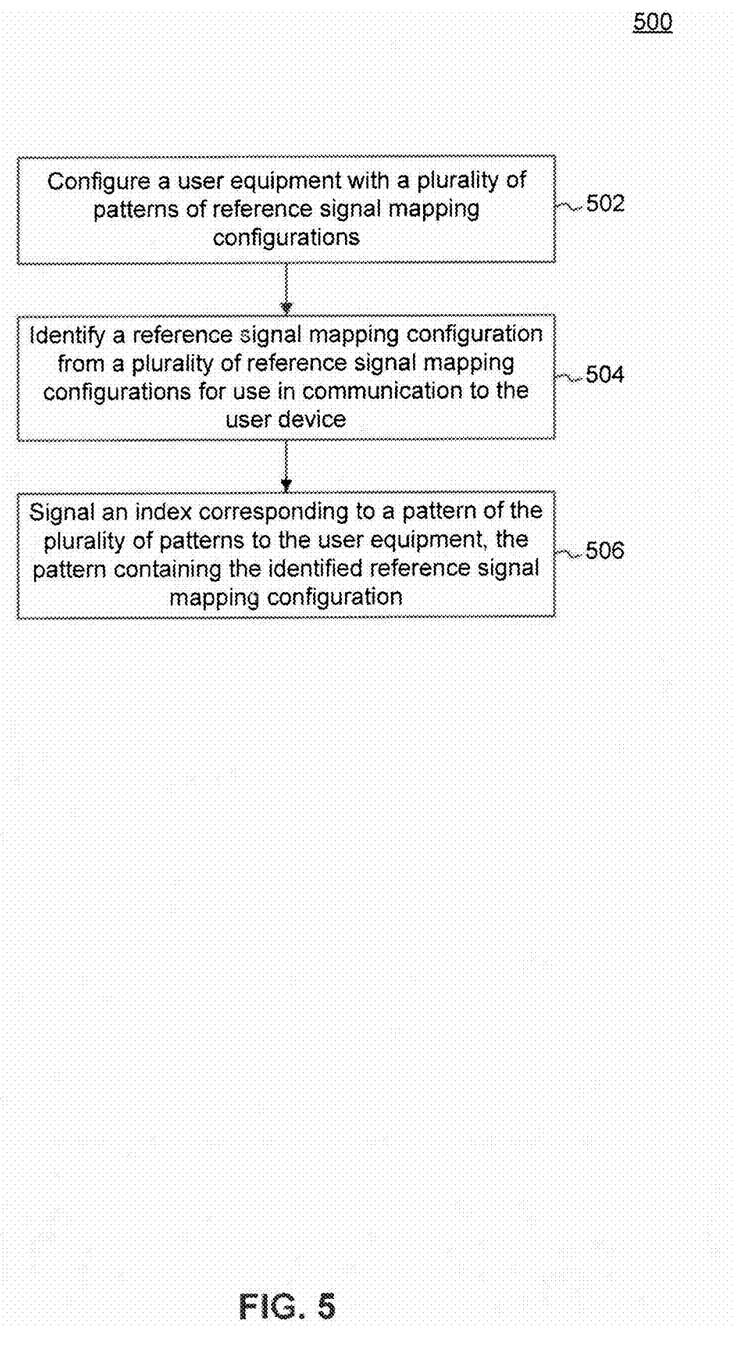
FIG. 5 illustrates another example process according to an embodiment.

FIG. 5 illustrates another example process 500 according to an embodiment. Example process 500 is provided for the purpose of illustration only and is not limiting of embodiments. Example process 500 can be performed by a base station, such as example base station 200, to signal a reference signal mapping configuration to a UE.

As shown in FIG. 5, process 500 begins in step 502, which includes configuring the UE with a plurality of patterns of reference signal mapping configurations. In an embodiment, each pattern includes multiple reference signal mapping configurations for various conditions of one or more particular communication related parameters. For example, each pattern may include multiple reference signal mapping configurations for various modulation schemes, as described above with respect to the example patterns illustrated in FIGS. 3A-3D. The UE stores the plurality of patterns received from the base station in a memory of the UE.

Subsequently, step 504 includes identifying a reference signal mapping configuration from a plurality of reference signal mapping configurations for use in communication to the UE. In an embodiment, step 504 further includes identifying a pattern from the plurality of patterns based one or more communication related parameters associated with the UE.

Process 500 terminates in step 506, which includes signaling an index corresponding to a pattern of the plurality of patterns to the UE, where the signaled pattern contains the reference signal mapping configuration identified in step 504. In an embodiment, $\log_2(M)$ bits are used to signal the index, where M corresponds to the total number of possible patterns.

The UE uses the index to identify the pattern and then identifies the reference signal mapping configuration being used by the base station based on the one or more communication related parameters associated with the UE. For example, the UE may use its knowledge of the modulation scheme to determine the reference signal mapping configuration being used from the multiple configurations contained in the pattern.

In an embodiment, the base station can use process 500 to implement a semi-static mode and a dynamic mode. In the semi-static mode, the reference signal mapping is configured by higher layer signaling and can be typically valid for hundreds of milliseconds. The semi-static mode is suitable when the communication related parameters based on which the configuration is determined are relatively stable. For example, the UE may not be moving, or the configuration may be determined based on fixed parameters of the UE (e.g., antenna configuration, interference management capability, etc.). In the dynamic mode, the reference signal mapping configuration is determined and signaled at a higher rate (e.g., every 1 millisecond) to the UE. In an embodiment, the reference signal mapping configuration is indicated in the Downlink Control Information (DCI) of the Physical Downlink Control Channel (PDCCH) to the UE.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A base station, comprising:
   a memory that stores a plurality of reference signal mapping configurations; and
   a processor, coupled to the memory, configured to:
      determine one or more communication related parameters associated with a user equipment, the one or more communication related parameters including a modulation order associated with the user equipment;
      identify a first reference signal mapping configuration from among the plurality of reference signal mapping configurations stored in the memory based at least in part on the modulation order associated with the user equipment; and
      embed a plurality of reference signal bits within a user data bit stream for the user equipment in accordance with the first reference signal mapping configuration to generate a combined bit stream.

2. The base station of claim 1, wherein the one or more communication related parameters further include a modulation and coding scheme for communication with the user equipment, a distance of the user equipment relative to the base station, an antenna configuration at the user equipment, interference management capability of the user equipment, or a rank of the user equipment.

3. The base station of claim 1, wherein the first reference signal mapping configuration includes locations of resource elements for carrying reference signals within a physical resource block (PRB) pair allocated to the user equipment.

4. The base station of claim 3, wherein the reference signals are Demodulation Reference Signals (DMRS).

5. The base station of claim 3, further comprising:
   a symbol mapper configured to generate a plurality of symbols from the combined bit stream; and
   a multi-carrier modulator configured to modulate the plurality of symbols to generate a multi-carrier subframe.

6. The base station of claim 5, further comprising:
   a transmitter configured to transmit the multi-carrier subframe to the user equipment in the PRB pair allocated to the user equipment.

7. The base station of claim 6, wherein the plurality of symbols comprise a plurality of reference symbols corresponding to the plurality of reference signal bits, and wherein the transmitter is further configured to transmit the plurality of reference symbols at the resource elements for carrying reference signals within the PRB pair.

8. The base station of claim 1, wherein the processor is further configured to:
   detect a change in the modulation order of the user equipment; and
   identify a second reference signal mapping configuration from among the plurality of reference signal mapping configurations responsive to the change in the modulation order.

9. The base station of claim 8, wherein the change in the modulation order corresponds to an increase in the modulation order of the user equipment, and wherein the second reference signal mapping configuration includes a larger number of resource elements for carrying reference signals than the first reference signal mapping configuration.

10. The base station of claim 1, wherein the processor is further configured to:
    detect a change in a distance of the user equipment relative to the base station; and
    identify a second reference signal mapping configuration from among the plurality of reference signal mapping configurations responsive to the change.

11. The base station of claim 10, wherein the change in the distance of the user equipment corresponds to an increase in the distance of the user equipment relative to the base station, and wherein the second reference signal mapping configuration includes a larger number of resource elements for carrying reference signals than the first reference signal mapping configuration.

12. A method performed by a base station, comprising:
    determining one or more communication related parameters associated with a user equipment, the one or more communication related parameters including a modulation order associated with the user equipment;

identifying a first reference signal mapping configuration from among a plurality of reference signal mapping configurations based at least in part on the modulation order associated with the user equipment; and
embedding a plurality of reference signal bits within a user data bit stream for the user equipment in accordance with the first reference signal mapping configuration.

13. The method of claim 12, wherein the one or more communication related parameters further include one or more of: a modulation and coding scheme for communication with the user equipment, a distance of the user equipment relative to the base station, an antenna configuration at the user equipment, interference management capability of the user equipment, or a rank of the user equipment.

14. The method of claim 12, wherein the first reference signal mapping configuration includes locations of resource elements for carrying reference signals within a physical resource block (PRB) pair allocated to the user equipment.

15. The method of claim 12, further comprising:
detecting a change in the modulation order of the user equipment; and
identifying a second reference signal mapping configuration from among the plurality of reference signal mapping configurations responsive to the change in the modulation order of the user equipment.

16. The method of claim 15, wherein the change in the modulation order corresponds to an increase in the modulation order of the user equipment, and wherein the second reference signal mapping configuration includes a larger number of resource elements for carrying reference signals than the first reference signal mapping configuration.

17. A base station, comprising:
a memory that stores a plurality of reference signal mapping configurations; and
a processor, coupled to the memory, configured to:
determine one or more communication related parameters associated with a user equipment, the one or more communication related parameters including a modulation order associated with the user equipment;
identify a reference signal mapping configuration from among the plurality of reference signal mapping configurations stored in the memory based at least in part on the modulation order associated with the user equipment, wherein the reference signal mapping configuration includes locations of resource elements for carrying reference signals within a physical resource block (PRB) pair allocated to the user equipment; and
signal the reference signal mapping configuration to the user equipment.

18. The base station of claim 17, wherein the processor is further configured to:
embed a plurality of reference signal bits within a user data bit stream for the user equipment in accordance with the reference signal mapping configuration to generate a combined bit stream.

19. The base station of claim 17, wherein the one or more communication related parameters include a modulation and coding scheme for communication with the user equipment, a distance of the user equipment relative to the base station, an antenna configuration at the user equipment, interference management capability of the user equipment, and a rank of the user equipment.

20. The base station of claim 18, further comprising:
a symbol mapper configured to generate a plurality of symbols from the combined bit stream; and
a multi-carrier modulator configured to modulate the plurality of symbols to generate a multi-carrier subframe.

* * * * *